United States Patent
Ishioka et al.

(10) Patent No.: US 12,391,192 B2
(45) Date of Patent: Aug. 19, 2025

(54) VEHICULAR FRONT STRUCTURE INCLUDING VEHICLE FRONT FACE SENSOR UNIT AND FLOOR CROSSING MEMBER

(71) Applicant: TOYOTA JIDOSHA KABUSHIKI KAISHA, Toyota (JP)

(72) Inventors: Hirotaka Ishioka, Toyota (JP); Hideo Takeda, Hekinan (JP); Norimasa Koreishi, Miyoshi (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 380 days.

(21) Appl. No.: 18/124,030

(22) Filed: Mar. 21, 2023

(65) Prior Publication Data

US 2023/0303009 A1    Sep. 28, 2023

(30) Foreign Application Priority Data

Mar. 23, 2022   (JP) ................................ 2022-046620

(51) Int. Cl.
*B60R 11/04*   (2006.01)
*B60R 21/02*   (2006.01)
(Continued)

(52) U.S. Cl.
CPC .............. *B60R 11/04* (2013.01); *B60R 21/02* (2013.01); *B62D 25/20* (2013.01);
(Continued)

(58) Field of Classification Search
CPC ............... B60R 11/04; B60R 2021/003; B60R 2021/0046; B60R 2021/006; B60R 2021/0069; B60R 2021/0004; B60R 2011/004; B60R 2300/301; B60R 2021/0213; B62D 25/20
See application file for complete search history.

(56) References Cited

U.S. PATENT DOCUMENTS

2005/0253694 A1* 11/2005 Kuznarowis .......... B61L 23/041
                                                          340/436
2010/0262341 A1* 10/2010 Alguera ............. B62D 53/0814
                                                          701/49
(Continued)

FOREIGN PATENT DOCUMENTS

JP   2003-182641 A   7/2003
JP   2021-019413 A   2/2021

*Primary Examiner* — Daniel J Colilla
(74) *Attorney, Agent, or Firm* — Dinsmore & Shohl LLP (57) ABSTRACT

A driver's cab is located at the front end portion of a vehicle. A sensor unit is provided on the front face of a body of the vehicle and is located at the same height as the driver's-cab floor of the driver's cab. A floor crossing member extends along the lateral direction of the vehicle on the driver's-cab floor between the sensor unit and an accelerator pedal. The floor crossing member has both sides coupled one-to-one with a left front side member and a right front side member extending along the longitudinal direction of the vehicle, respectively, at the left front portion and right front portion of the vehicle. After entering the driver's cab due to a frontal collision, the sensor unit abuts on the floor crossing member, leading to suppression of the distance of entry of the sensor unit into the driver's cab.

2 Claims, 8 Drawing Sheets

(51) Int. Cl.
  *B62D 25/20*  (2006.01)
  *B60R 11/00*  (2006.01)
  *B60R 21/00*  (2006.01)

(52) U.S. Cl.
  CPC . *B60R 2011/004* (2013.01); *B60R 2021/0067* (2013.01); *B60R 2021/0213* (2013.01)

(56) References Cited

U.S. PATENT DOCUMENTS

| | | | |
|---|---|---|---|
| 2019/0220034 A1* | 7/2019 | Balogh | G05D 1/0246 |
| 2020/0406835 A1* | 12/2020 | Shitara | B60R 11/04 |
| 2021/0016670 A1 | 1/2021 | Yamanouchi et al. | |
| 2021/0147001 A1* | 5/2021 | Lian | B60K 1/04 |
| 2022/0111799 A1 | 4/2022 | Hasegawa et al. | |
| 2022/0402560 A1 | 12/2022 | Hara et al. | |

* cited by examiner

VEHICULAR FRONT STRUCTURE INCLUDING VEHICLE FRONT FACE SENSOR UNIT AND FLOOR CROSSING MEMBER

CROSS REFERENCE TO RELATED APPLICATION

This application claims priority to Japanese Patent Application No. 2022-046620 filed on Mar. 23, 2022 which is incorporated herein by reference in its entirety including the specification, claims, drawings, and abstract.

TECHNICAL FIELD

The present disclosure relates to a vehicular front structure and particularly relates to a crashworthy structure for a vehicular structure in which a driver's cab is provided at a front end portion.

BACKGROUND

JP 2021-19413 A discloses a vehicle (10) in which a sensor unit (30) for automated driving is provided on the front face of its body. In particular, paragraph 0076 describes the sensor unit (30) provided on the front face of the vehicle (10). Note that the reference numerals in the above brackets are used in JP 2021-19413 A and thus are not related to the reference numerals in an embodiment in the present specification.

SUMMARY

In a vehicle having a front end portion provided with a driver's cab, it is desirable to suppress the distance of entry of a sensor unit, provided on the front face of a body of the vehicle, into the driver's cab in the event of a frontal collision.

According to the present disclosure, there is provided a vehicular front structure including: a driver's cab provided at a front end portion of a vehicle; a sensor unit provided on a front face of a body of the vehicle, the sensor unit being located at a height identical to a height of a floor of the driver's cab, the sensor unit being configured to acquire an external situation; and a floor crossing member having both ends coupled one-to-one with a left front side member and a right front side member extending along a longitudinal direction of the vehicle, respectively, at a left front portion and a right front portion of the body, the floor crossing member extending along a lateral direction of the vehicle on the floor between the sensor unit and an accelerator pedal.

The floor crossing member receives the sensor unit having entered the driver's cab due to a collision, leading to suppression of the distance of entry of the sensor unit.

In the vehicular front structure, the floor crossing member can be provided across a service hole provided to the floor. Even in a case where the floor is provided with a service hole, the floor crossing member can be disposed.

Furthermore, the floor crossing member provided across the service hole can include a center portion integrated with a hatch for the service hole, an end portion on one side integrated with the floor, and an end portion on another side integrated with the floor. When the hatch is closed, both ends of the center portion of the floor crossing member are disposed one-to-one at the end portion on the one side and the end portion on the other side and then the center portion, the end portion on the one side, and the end portion on the another side are coupled together, resulting in formation of the floor crossing member coupled with the left and right front side members. Because of the divided structure of the floor crossing member, even in a case where the floor crossing member is provided across the service hole, the opening of the service hole is not interrupted.

The distance of entry of the sensor unit, provided on the front face of the body, into the driver's cab due to a frontal collision can be suppressed.

DESCRIPTION OF EMBODIMENTS

An embodiment of the present disclosure will be described below with reference to the drawings. In the following description, unless otherwise specified, relative positional, directional, and orientational terms, such as front, ahead of, rear, behind, left, leftward, right, rightward, up, above, down, and below, indicate the relative position, direction, and orientation based on a vehicle. The front-rear direction, left-right direction, and up-down direction of the vehicle are defined, respectively, as a longitudinal direction, a lateral direction, and a vertical direction.

Figure 1:
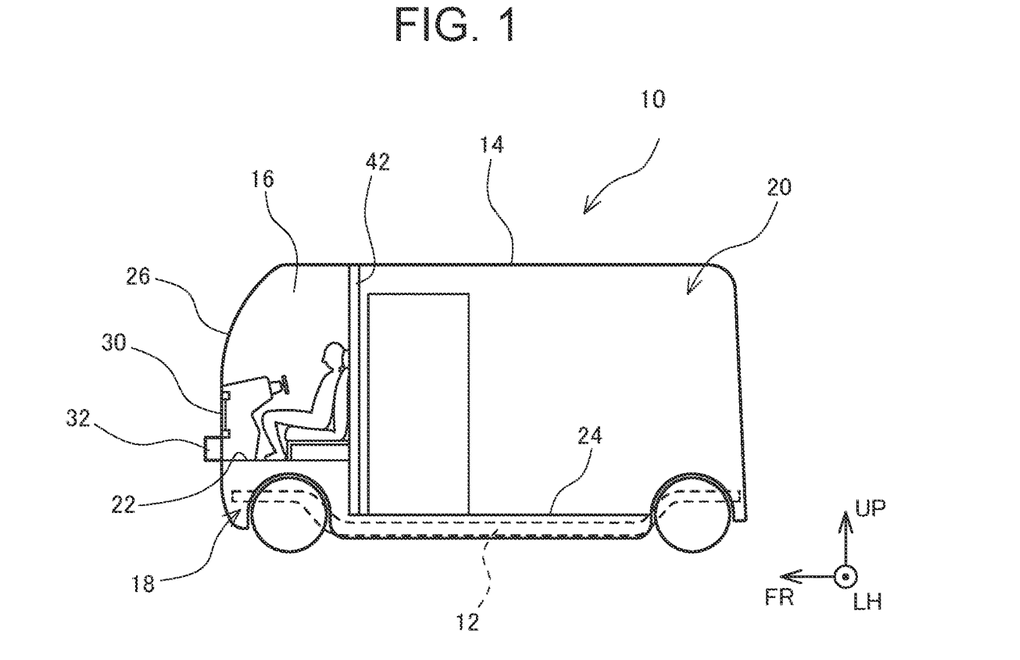
FIG. 1 is a schematic side view of a schematic configuration of a vehicle according to the present embodiment.

FIG. 1 is a schematic view of the configuration of main components of a vehicle 10. The vehicle 10 has a structure in which a body 14 is mounted on a ladder frame 12. The vehicle 10 includes a driver's cab 16 and a motor compartment 18 disposed at its front end portion, in which the motor compartment 18 is located below the driver's cab 16. Thus, the vehicle 10 serves as a so-called cabover vehicle. The motor compartment 18 houses an electric motor (not illustrated) as an exemplary motor that drives the vehicle. A passenger cabin 20 that passengers board is disposed behind the driver's cab 16. A driver's-cab floor 22 of the driver's cab 16 is located higher than a passenger-cabin floor 24 of the passenger cabin 20.

Figure 2:
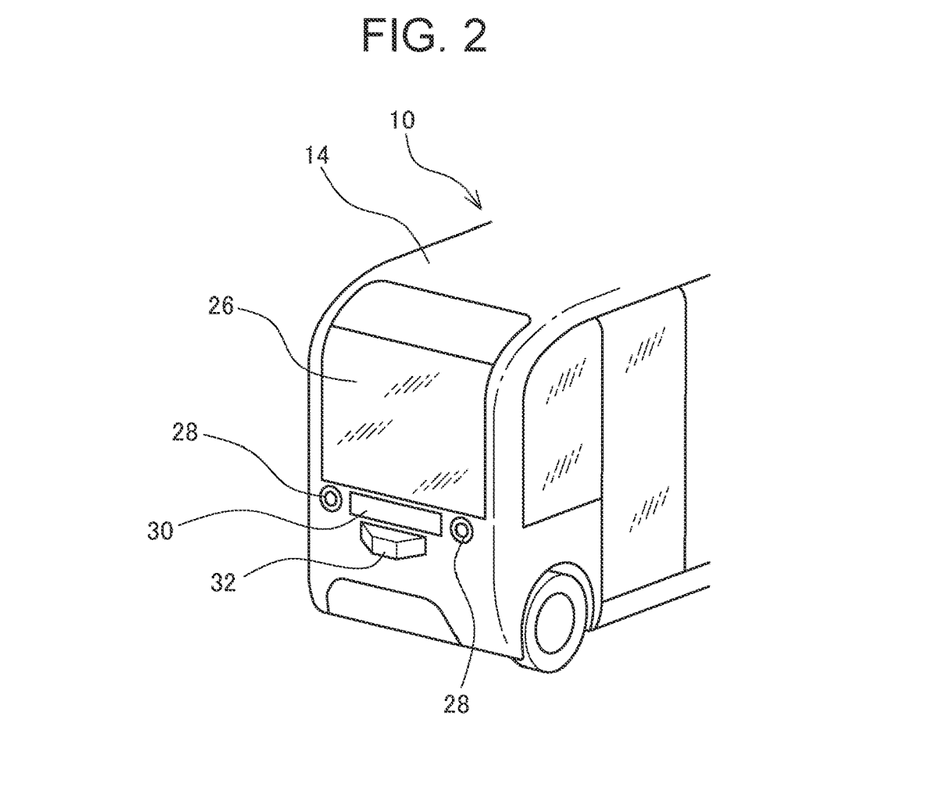
FIG. 2 is a schematic perspective view of the configuration of the front face of the vehicle according to the present embodiment.

FIG. 2 illustrates the front face of the vehicle 10. A headlight 28 is disposed on the left below a windshield 26 and another headlight 28 is disposed on the right below the windshield 26. In addition, an external display 30 is disposed between the headlights 28. The external display 30 provides external objects, such as pedestrians and oncoming vehicles, with information regarding the situation of the vehicle 10. For example, the external display 30 displays a message prompting a pedestrian who is trying to cross the road to cross or displays, if the vehicle 10 serves as a route bus, the destination. If the vehicle 10 is capable of automated driving, the external display 30 displays "under automated driving" or "under unautomated driving."

In addition, for example, below the external display 30 on the front face of the vehicle 10, a sensor unit 32 is disposed in order to acquire an external situation. The external situation acquired by the sensor unit 32 is used as information for driving assistance or automated driving. The sensor unit 32 may include a light detection and ranging (LiDAR) device that measures the distance to a target around the vehicle.

Figure 3:
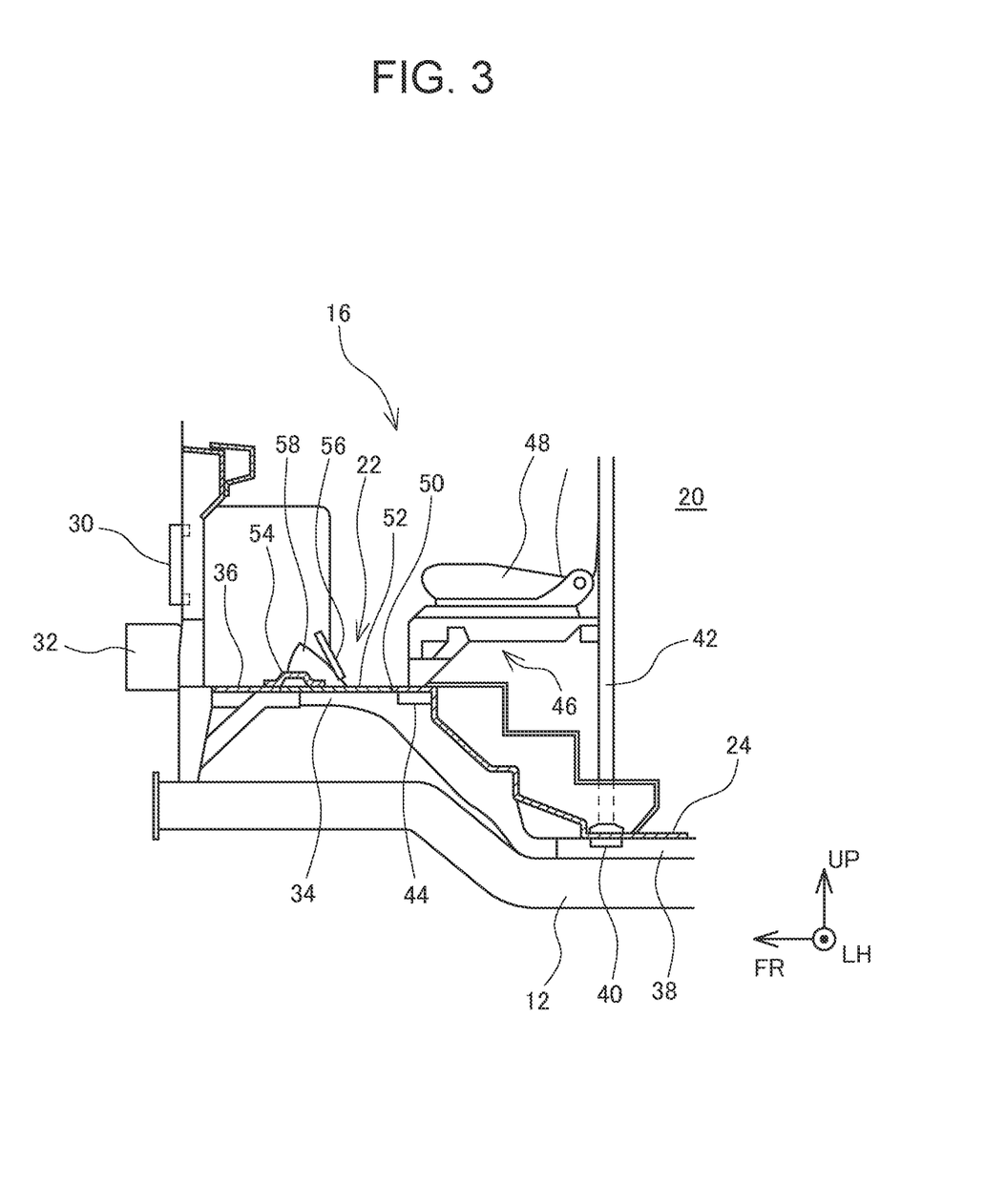
FIG. 3 is a schematic side view of the configuration of a driver's cab.
Figure 4:
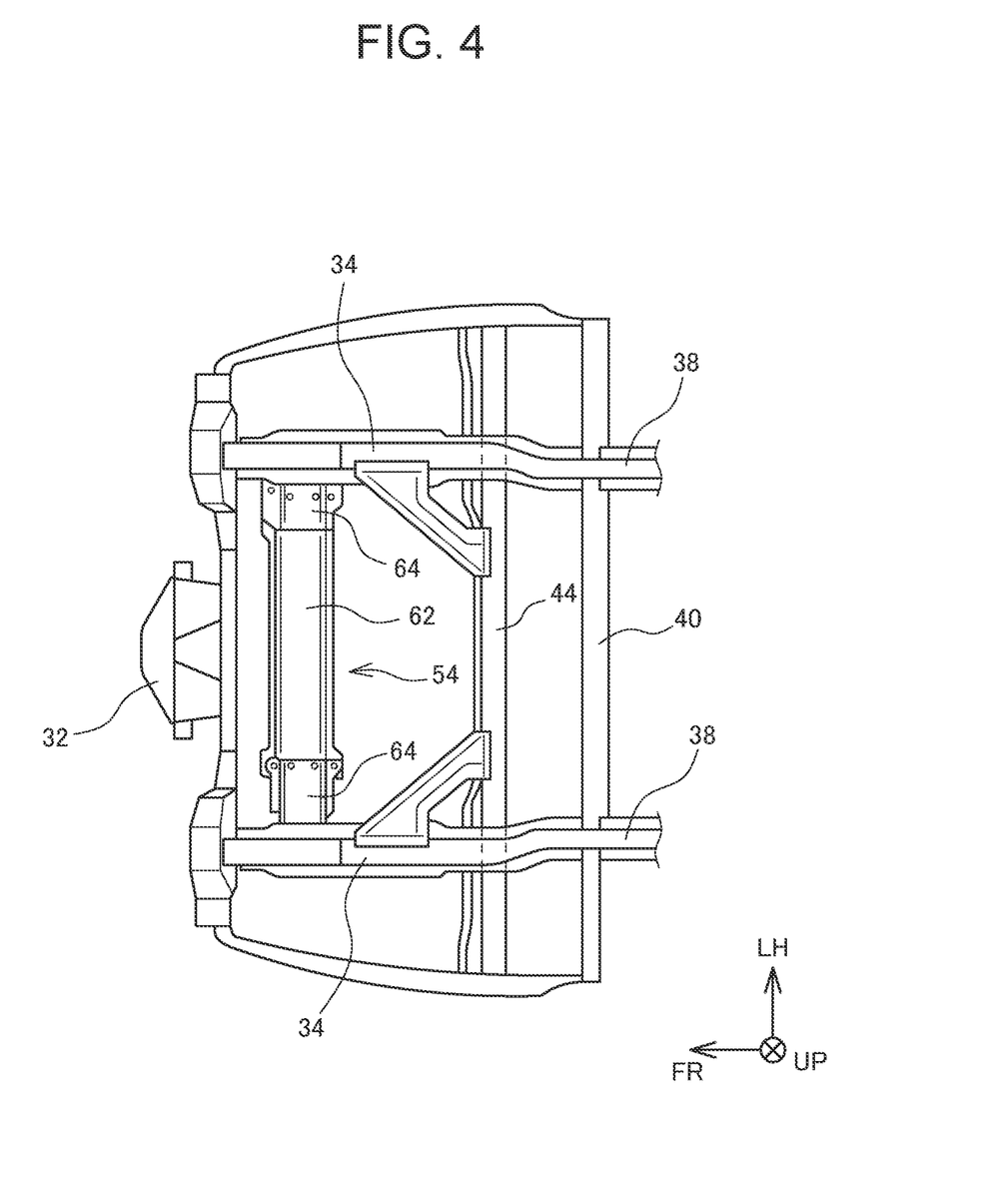
FIG. 4 is a bottom view of the frame structure of a front body viewed from below.

FIG. 3 is a schematic side view of a schematic structure of the driver's cab 16. FIG. 4 is a bottom view of the frame structure of the front portion of the body 14 with the vehicle 10 viewed from below (without a floor panel 36 and a hatch 52 for a service hole, to be described below). The body 14 mounted on the ladder frame 12 includes front side members 34 as frame members extending along the longitudinal direction, one-to-one, on the left and right of the front portion of the body 14. Each of the front side members 34 has a front portion supporting the floor panel 36 of the driver's-cab floor 22 and a rear portion inclining rearward and downward and having a rear end coupled with a center side member 38 supporting the passenger-cabin floor 24. The frame structure includes a passenger-cabin crossing member 40 extending in the lateral direction along the front edge of the passenger-cabin floor 24. The passenger-cabin crossing member 40 intersects and is coupled with the center side members 38. A plurality of supports 42 are arrayed along the direction in which the passenger-cabin crossing member 40 extends, and stand on the passenger-cabin crossing member 40. A partition board may be attached to the supports 42 such that a partition wall is formed between the driver's cab 16 and the passenger cabin 20. The frame structure further includes a driver's-cab crossing member 44 extending in the lateral direction along the rear edge of the driver's-cab floor 22. The driver's-cab crossing member 44 intersects and is coupled with the front side members 34. The supports 42 and the driver's-cab crossing member 44 support a seat base 46 on which a driver's seat 48 is placed and fixed.

The floor panel 36 of the driver's-cab floor 22 is provided with a service hole 50 for access to the motor compartment 18. The service hole 50 is usually covered with the hatch 52. The hatch 52 serves as part of the driver's-cab floor 22 with the service hole 50 covered with the hatch 52. On the driver's-cab floor 22, there is provided a floor crossing member 54 extending in the lateral direction and having left and right ends coupled one-to-one with the front side members 34. On the floor crossing member 54, there fixed a pedal bracket 58 supporting an accelerator pedal 56. The floor crossing member 54 is located ahead of the accelerator pedal 56. A driver's foot that operates the accelerator pedal 56 is located behind the floor crossing member 54. The sensor unit 32 described above is disposed at the same height as the driver's-cab floor 22. The floor crossing member 54 is located behind the sensor unit 32.

Figure 5:
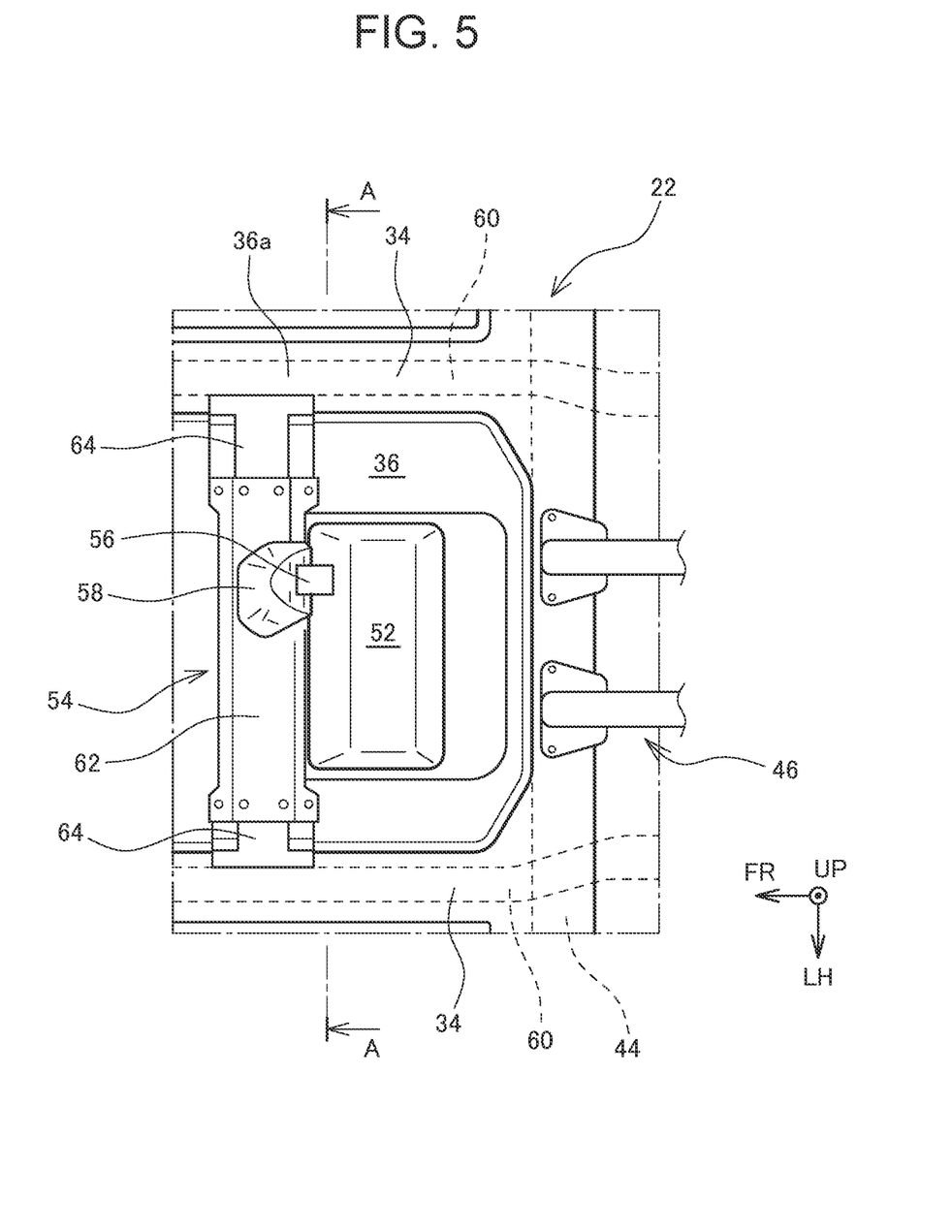
FIG. 5 is a plan view of a schematic configuration of a driver's-cab floor.
Figure 6:
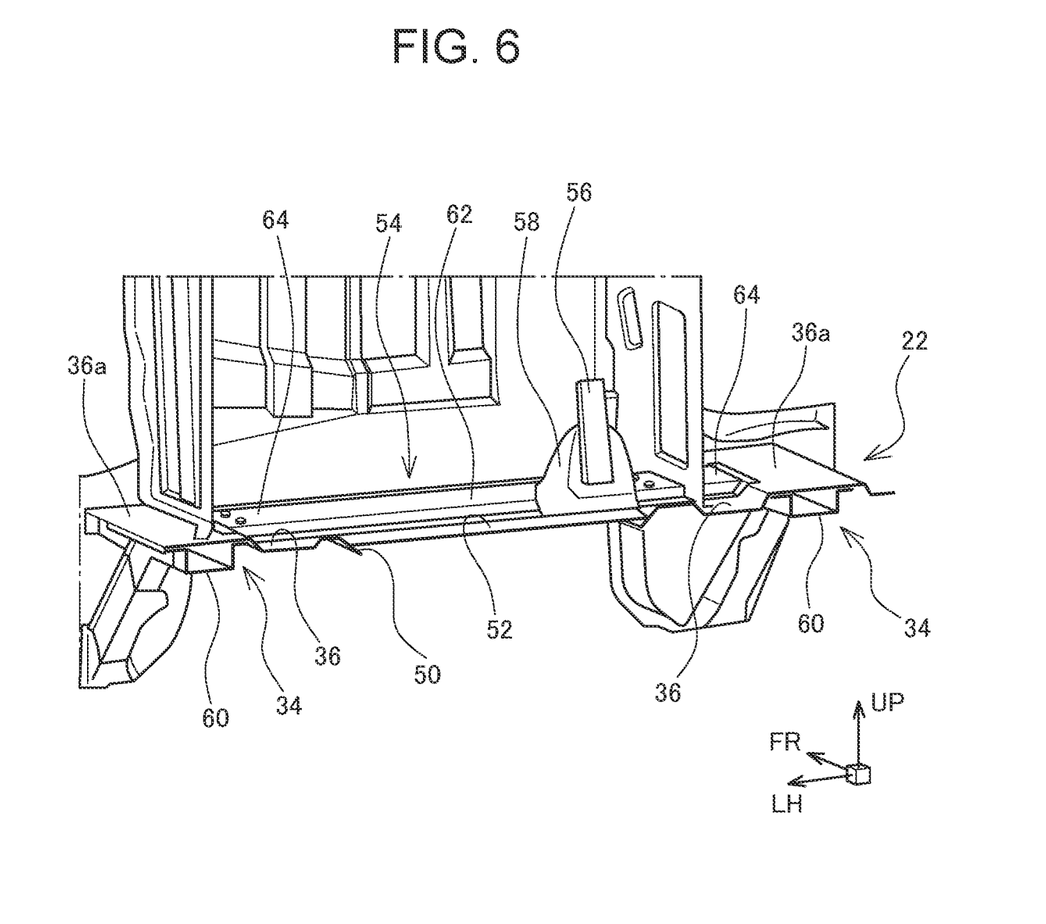
FIG. 6 is a perspective sectional view of the structure of the driver's-cab floor, the perspective sectional view being taken along line A-A line of FIG. 5.
Figure 7:
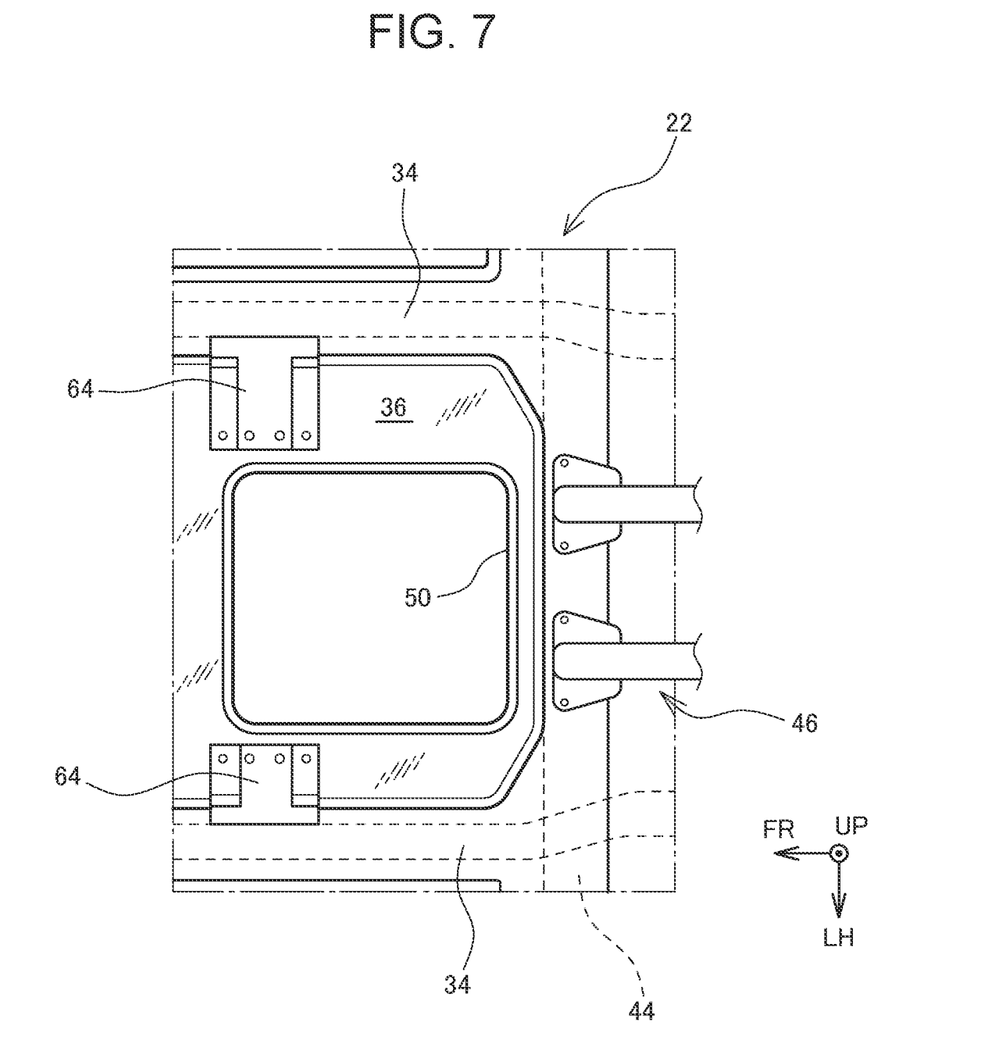
FIG. 7 is a plan view of a state resulting from removal of a hatch for a service hole from the state in FIG. 5.
Figure 8:
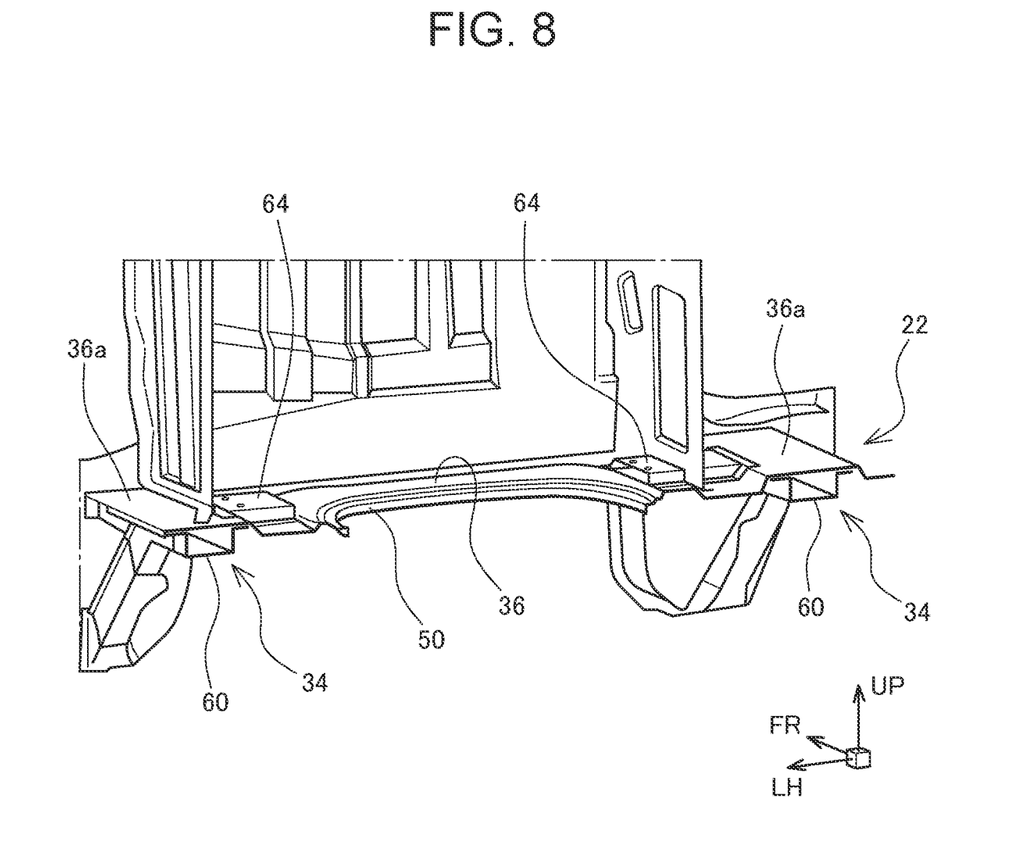
FIG. 8 is a perspective sectional view of a state resulting from removal of the hatch for the service hole from the state in FIG. 6.
Figure 9:
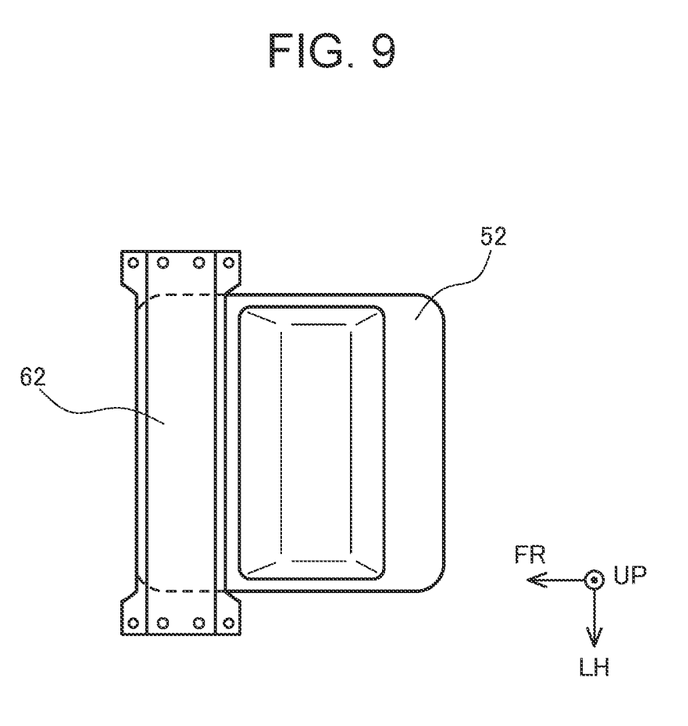
FIG. 9 is a plan view of the hatch for the service hole.

FIGS. 5 and 6 each illustrate the configuration of the driver's-cab floor 22 and peripheral parts thereof. FIG. 5 is a plan view, and FIG. 6 is a perspective sectional view taken along line A-A of FIG. 5. FIGS. 7 and 8 each illustrate a state resulting from removal of the hatch 52 for the service hole 50. FIGS. 7 and 8 correspond to FIGS. 5 and 6, respectively. FIG. 9 illustrates the hatch 52 removed from the service hole 50.

Each of the front side members 34 includes a protrusion 36a and a lower member 60. The protrusion 36a is part of the floor panel 36 and protrudes upward like a hat in shape in sectional view. The lower member 60 is shaped like a hat in sectional view and is located below the protrusion 36a. One of the protrusions 36a and the corresponding lower member 60 extend along the longitudinal direction on the left of the body 14. The other of the protrusions 36a and the corresponding lower member 60 extend along the longitudinal direction on the right of the body 14. Each lower member 60 shaped like a hat has brims welded to the top face of the protrusion 36a, forming the front side member 34 having a closed cross section. The floor crossing member 54 has both ends coupled one-to-one with side faces of the left and right protrusions 36a by a technique, such as welding. The floor crossing member 54 extends along the lateral direction over the service hole 50.

In the longitudinal direction of the floor crossing member 54, the floor crossing member 54 has three parts consisting of a center portion 62, an end portion 64 on one side, and an end portion 64 on the other side. The center portion 62 and the two end portions 64 each have a cross section shaped like a hat, in which its opening shaped like a hat faces downward. Each end portion 64 is coupled with the side face of the corresponding protrusion 36a of the floor panel 36 as described above and is additionally coupled with the base face of the floor panel 36 by a technique, such as welding. Thus, each end portion 64 having a cross section shaped like a hat and the floor panel 36 form a closed sectional structure. Each end portion 64 extends inward in the lateral direction from the corresponding front side member 34 to the neighborhood of the edge of the service hole 50. The center portion 62 of the floor crossing member 54 is located between the end portion 64 on the one side and the end portion 64 on the other side and has both ends coupled one-to-one with the end portions 64 by fasteners, such as nuts and bolts. Most of the center portion 62 is located above the service hole 50. Coupling the center portion 62 with the end portion 64 on the one side and the end portion 64 on the other side of the center portion 62 integrates the three parts, resulting in formation of the floor crossing member 54 having both ends coupled one-to-one with the left and right front side members 34. Due to removal of the center portion 62 from the end portions 64, the portion covering the service hole 50 is removed from the floor crossing member 54. Removal of the hatch 52 exposes the entirety of the service hole 50.

As illustrated in FIG. 9, the center portion 62 of the floor crossing member 54 may be integrated with the hatch 52 for the service hole. The center portion 62 is coupled and integrated with the hatch 52 by a technique, such as welding. The center portion 62 having a cross section shaped like a hat and the tabular face of the hatch 52 are coupled together, forming a closed sectional structure. Integration of the center portion 62 of the floor crossing member 54 and the hatch 52 enables removal of the hatch 52 together with the center portion 62 of the floor crossing member 54, resulting in more efficient work in comparison to individual removal.

Upon occurrence of a frontal collision of the vehicle 10, the sensor unit 32 protruding forward from the front face of the body enters the driver's cab 16. After entering the driver's cab 16, the sensor unit 32 further moves backward and then abuts on the floor crossing member 54 located behind the sensor unit 32, so that the sensor unit 32 is inhibited from moving further backward. Even in a case where the sensor unit 32 does not protrude forward, the floor crossing member 54 enables inhibition of the sensor unit 32 from moving backward due to crush of the front face of the body.

The invention claimed is:

1. A vehicular front structure comprising:
a driver's cab provided at a front end portion of a vehicle;
a sensor unit provided on a front face of a body of the vehicle, the sensor unit being located at a height identical to a height of a floor of the driver's cab, the sensor unit being configured to acquire an external situation; and
a floor crossing member having both ends coupled one-to-one with a left front side member and a right front side member extending along a longitudinal direction of the vehicle, respectively, at a left front portion and a right front portion of the body, the floor crossing member extending along a lateral direction of the vehicle on the floor between the sensor unit and an accelerator pedal,
wherein the floor crossing member is provided across a service hole with which the floor is provided.

2. The vehicular front structure according to claim 1, wherein the floor crossing member includes a center portion integrated with a hatch for the service hole, an end portion on one side integrated with the floor, and an end portion on another side integrated with the floor, and
when the hatch is closed, the center portion is disposed between the end portion on the one side and the end portion on the other side such that the center portion, the end portion on the one side, and the end portion on the another side are coupled and integrated together.

* * * * *